(12) United States Patent
Narusawa et al.

(10) Patent No.: US 6,556,186 B2
(45) Date of Patent: *Apr. 29, 2003

(54) KEYBOARD INPUT DEVICE WITH POINTING DEVICE FOR CONTROLLING CURSOR POSITION ON GRAPHIC DISPLAY AND THE LIKE

(75) Inventors: Tsuyoshi Narusawa, Fukushima-ken (JP); Masaru Komatsu, Fukushima-ken (JP); Shinji Hirano, Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/488,212

(22) Filed: Jan. 19, 2000

(65) Prior Publication Data

US 2003/0016209 A1 Jan. 23, 2003

(30) Foreign Application Priority Data

Jan. 25, 1999 (JP) .......................................... 11-015089

(51) Int. Cl.$^7$ ................................................ G09F 3/00
(52) U.S. Cl. ...................... 345/168; 345/156; 345/157; 345/158; 345/161; 345/164; 341/20; 341/22
(58) Field of Search ................................. 345/161, 164, 345/168, 156, 157, 158; 341/20, 22

(56) References Cited

U.S. PATENT DOCUMENTS

| | | | |
|---|---|---|---|
| 5,754,167 A | | 5/1998 | Narusawa et al. |
| 5,844,546 A | | 12/1998 | Mochizuki |
| 5,889,507 A | * | 3/1999 | Engle et al. ................. 345/161 |
| 6,067,005 A | * | 5/2000 | DeVolpi ....................... 338/47 |
| 6,184,867 B1 | * | 2/2001 | Kandogan et al. ........... 345/161 |
| 6,239,786 B1 | * | 5/2001 | Burry et al. ................. 345/161 |
| 6,460,103 B1 | * | 10/2002 | Powers et al. ............... 710/305 |

FOREIGN PATENT DOCUMENTS

| | | |
|---|---|---|
| EP | 0 407 012 A2 | 1/1991 |
| EP | 0 702 288 A2 | 3/1996 |
| GB | 2 303 251 A | 2/1997 |

* cited by examiner

Primary Examiner—Richard Hjerpe
Assistant Examiner—Jean Lesperance
(74) Attorney, Agent, or Firm—Brinks Hofer Gilson & Lione

(57) ABSTRACT

In a keyboard input device, a mounting member of a pointing device has holes, and a base has projections. The projections are joined to the holes by caulking, thereby mounting the pointing device on the base. An operating portion of the pointing device is placed among a plurality of control keys.

13 Claims, 5 Drawing Sheets

KEYBOARD INPUT DEVICE WITH POINTING DEVICE FOR CONTROLLING CURSOR POSITION ON GRAPHIC DISPLAY AND THE LIKE

BACKGROUND OF THE INVENTION

1. Field of the Invention

The present invention relates to a keyboard input device having a pointing device for controlling the cursor position on a graphic display device and the like.

2. Description of the Related Art

In general, pointing devices, such as mice or trackballs, which are provided separately from keyboard input devices, are widely used in graphic display devices and the like. In this case, not only is space necessary for mounting the keyboard input device, but space is also necessary for mounting the pointing device, and this increases the footprint of the overall graphic display device.

Accordingly, Japanese Unexamined Patent Application No. 6-32421 discloses a combination of a keyboard input device having a plurality of control keys arranged in order and a pointing device having strain gauges, in which the pointing device is incorporated in the keyboard input device.

Such a keyboard input device integrally provided with a pointing device has the advantages of a smaller footprint and easier carrying, and demand therefor is increasing in the fields of portable personal computers and the like in which miniaturization is extremely important.

As shown in FIGS. 9 and 10, a pointing device 20 integrally incorporated in a conventional keyboard input device includes a control member 23 having a flat pedestal 21 at the bottom, and a prismatic operating portion 22 projecting upward from the center of the pedestal 21.

Strain gauges 24, such as resistors, are bonded on four outer side faces of the operating portion 22, and are connected to terminal portions 25a of a flexible substrate 25. A cap 26 is mounted on the top end of the operating portion 22.

The pointing device 20 having such a configuration is mounted on a metal plate 30 by directly mounting the pedestal 21 on the metal plate 30 and folding support pieces 30a, which are formed on the metal plate 30 by louvering, onto recesses 21a of the pedestal 21.

A plurality of control keys are arrayed on a plurality of contact portions (not shown) formed on a membrane switch 31. The cap 26 of the pointing device 20 is exposed, surrounded by a plurality of control keys.

The contact portions of the membrane switch 31 are turned on and off by operating the control keys. When the operating portion 22 is tilted or bent by imposing a load on the cap 26 of the pointing device 20 in the direction of the arrow in FIG. 10, the four strain gauges 24 are tensioned or compressed by the bending, and the voltages thereof change. A cursor on a display (not shown) can thereby be moved to a desired position in accordance with the amount of change in the voltages.

Such recent keyboard input devices, particularly those to be incorporated into notebook personal computers, must have low profiles. In order to achieve a low profile, it is necessary to reduce the height of the control keys and the height of the operating portion 22 in the pointing device 20.

However, height reduction of the operating portion 22 makes it difficult to mount the strain gauges 24 thereon.

For this reason, a keyboard input device has been proposed in which strain gauges are mounted on the upper surface or lower surface of a flat pedestal, a control member is tilted by applying load on an operating portion so as to bend the pedestal, and the bending of the pedestal is detected by the strain gauges.

If the pointing device having the strain gauges attached to the upper or lower surface of the pedestal is directly mounted on a metal plate by bending support pieces in the above-described manner, the force of bending of the support pieces is applied in a direction parallel to the pedestal, and thereby acts on the strain gauges. This makes it difficult to cause the strain gauges to function precisely, and to move the cursor on the display with accuracy.

SUMMARY OF THE INVENTION

In view of the above problems, an object of the present invention is to provide a keyboard input device in which a pointing device is mounted on a metal plate so that the strain gauges can function precisely.

According to one aspect of the present invention, there is provided a keyboard input device including: a membrane switch having a plurality of contacts; a plurality of control keys arranged on the contacts so as to operate the membrane switch; a base for placing the membrane switch thereon; and a pointing device mounted on the base and having a control member including an operating portion and a plurality of sensing elements, the control member being mounted on a mounting member, wherein one of the mounting member and the base has a hole, the other has a projection, the pointing device is mounted on the base by joining the projection and the hole by caulking, and the operating portion of the pointing device is placed among the plurality of control keys.

In the keyboard input device, one of the mounting member and the base has a hole, the other has a projection, the pointing device is mounted on the base by joining the projection and the hole by caulking, and the operating portion of the pointing device is placed among the plurality of control keys. Therefore, it is possible to provide a keyboard input device in which the mounting member can be mounted on the base without applying unnecessary load on the sensing elements, the beam portions can be reliably bent in response to the load applied on the operating portion, and the bending of the beam portions can be precisely detected by the sensing elements.

Preferably, the base and the mounting member are made of metal, and the projection is formed by burring or drawing.

In this case, working of the base is facilitated. Moreover, since the mounting member to be mounted on the base by caulking is made of metal, it is possible to increase the caulking strength of the projections, and to thereby reliably mount the pointing device on the base.

According to another aspect of the present invention, there is provided a keyboard input device including: a membrane switch having a plurality of contacts; a plurality of control keys arranged on the contacts so as to operate the membrane switch; a base for placing the membrane switch thereon; and a pointing device mounted on the base and having a control member including an operating portion and a plurality of sensing elements, the control member being mounted on a mounting member, wherein the mounting member and the base have holes, an eyelet or a rivet is passed through the holes in mutual alignment, and the pointing device is mounted on the base by caulking the eyelet or rivet.

The mounting member and the base have holes, and an eyelet or a rivet is passed through the holes in mutual alignment and is caulked, thereby mounting the pointing device on the base. Therefore, it is possible to provide a keyboard input device that further facilitates working of the base.

The mounting member may be mounted on the upper surface of the base.

In this case, the projection of the base and the hole of the mounting member can be aligned and assembled while being visually checked when mounting the pointing device on the base, which provides a keyboard input device having superior assembly characteristics.

The mounting member may be mounted on the lower surface of the base.

In this case, it is possible to make wide use of the upper surface of the base adjacent to the pointing device, and to increase the degree of flexibility in arranging the control keys.

Furthermore, even when the height of the control keys is further reduced, the amount of protrusion of the pointing device above the control keys can be also reduced, and therefore, the pointing device is also applicable to a low-profile keyboard input device.

Further objects, features, and advantages of the present invention will be apparent from the following description of the preferred embodiments with reference to the attached drawings.

DESCRIPTION OF THE PREFERRED EMBODIMENTS

Figure 1:
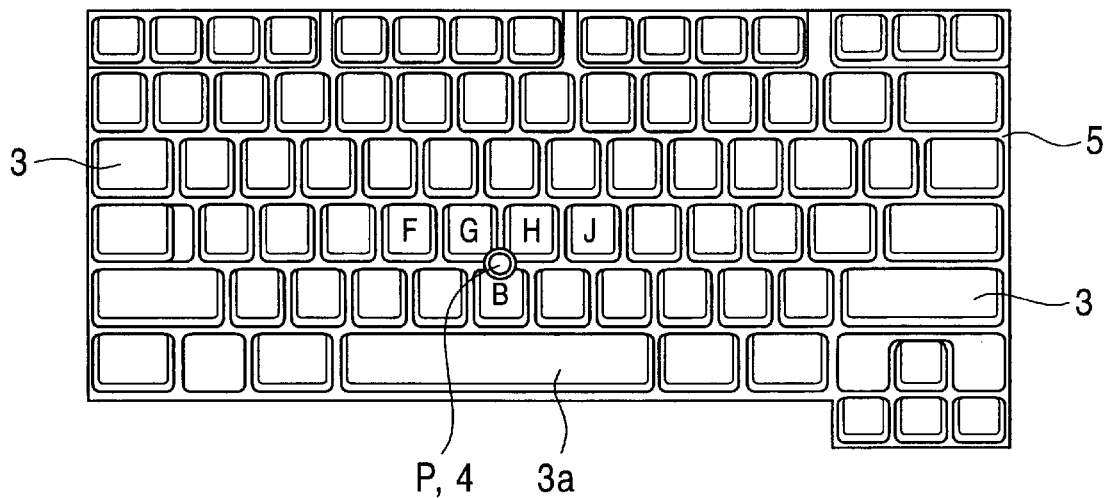
FIG. 1 is a top view of a keyboard input device according to an embodiment of the present invention.
Figure 3A:
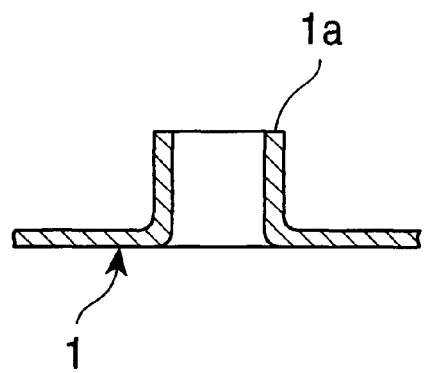
FIGS. 3A and 3B are partial sectional views of a projection formed on the base.
Figure 3B:
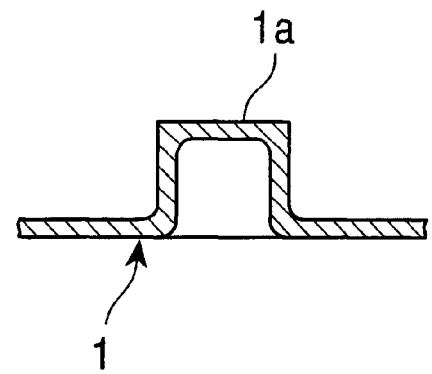
Figure 4:
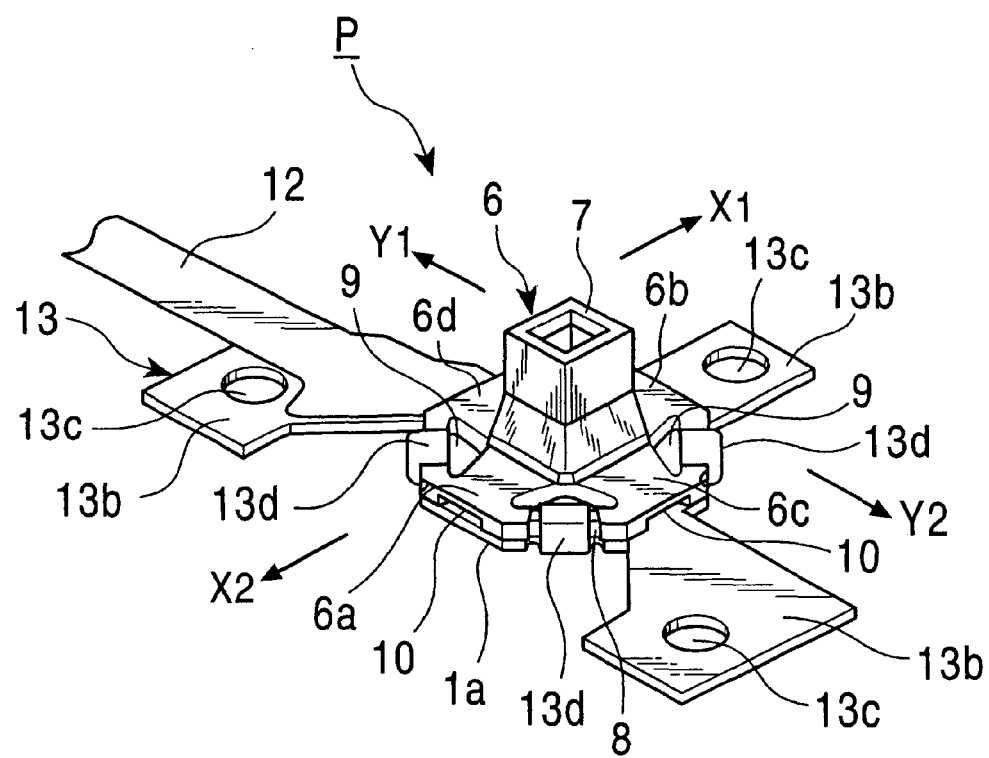
FIG. 4 is a perspective view of a pointing device according to the present invention.
Figure 5:
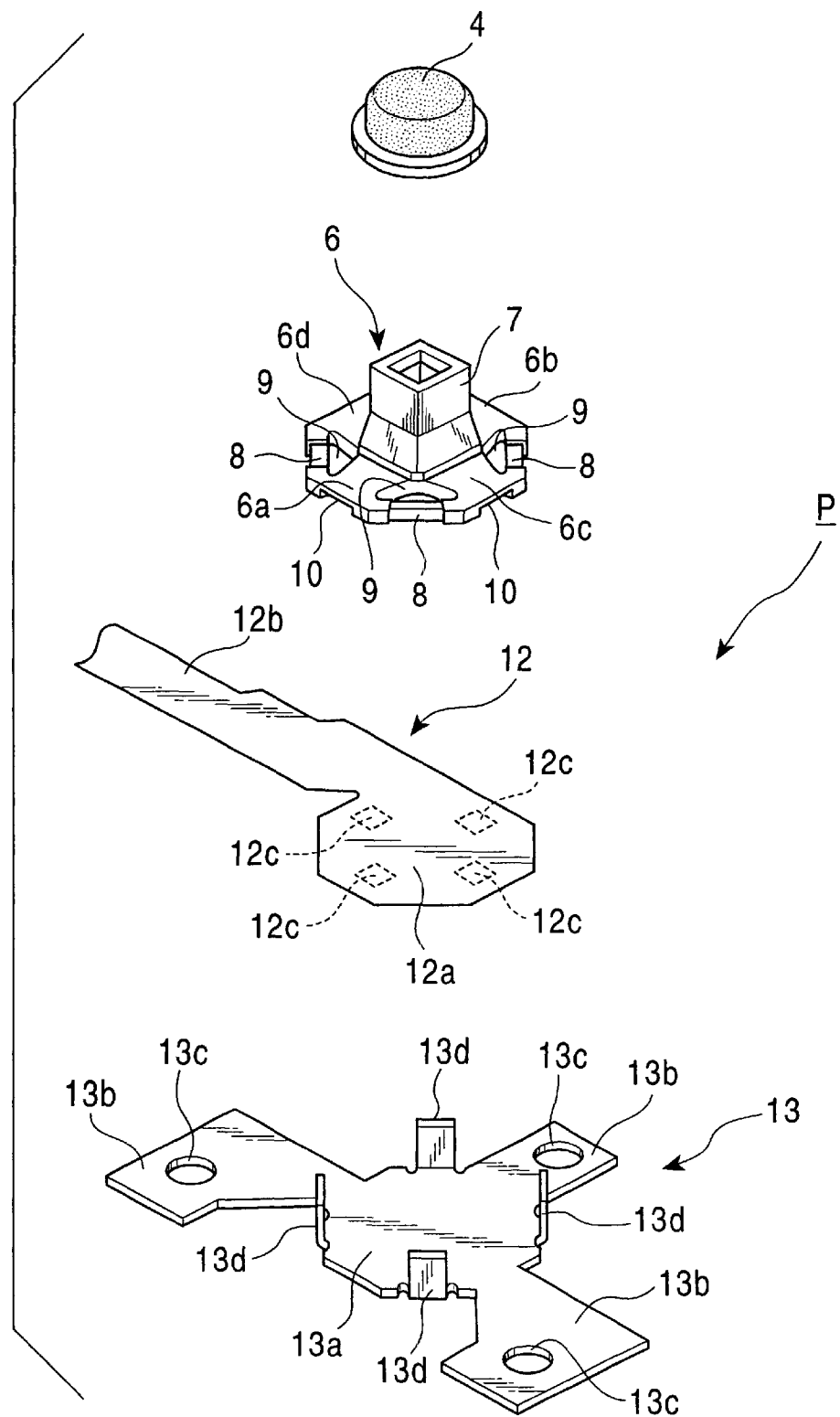
FIG. 5 is an exploded perspective view of the pointing device.
Figure 6:
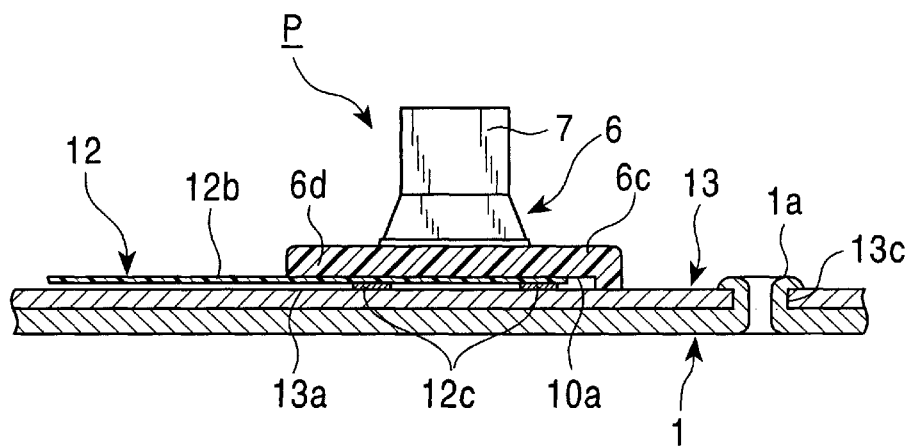
FIG. 6 is a cross-sectional view showing the principal part of the keyboard input device in which the pointing device is mounted.
Figure 7:
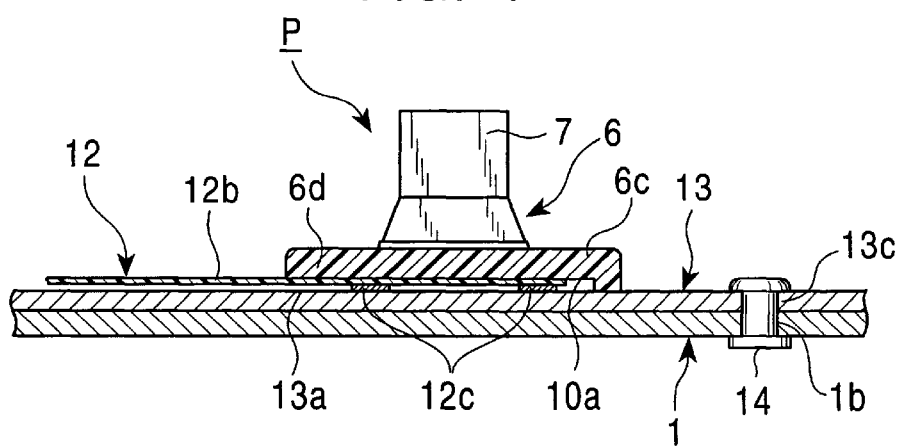
FIG. 7 is a cross-sectional view showing the principal part of a keyboard input device according to another embodiment of the present invention.
Figure 8:
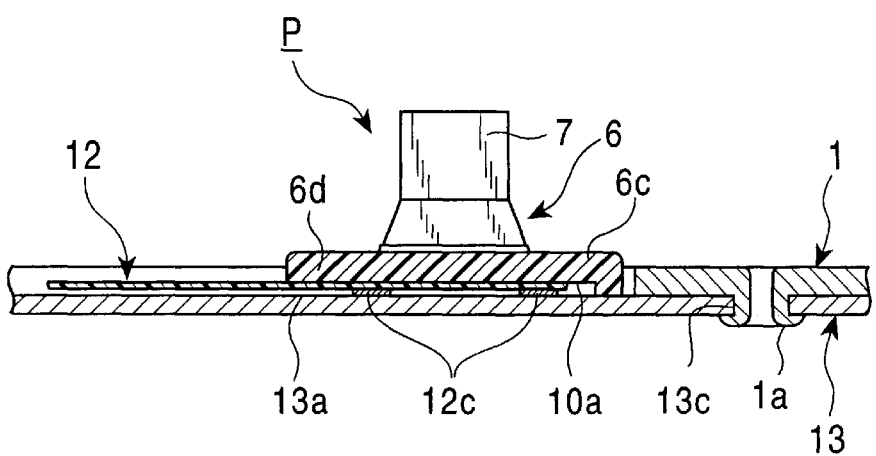
FIG. 8 is a cross-sectional view showing the principal part of a keyboard input device according to a further embodiment of the present invention.
Figure 9:
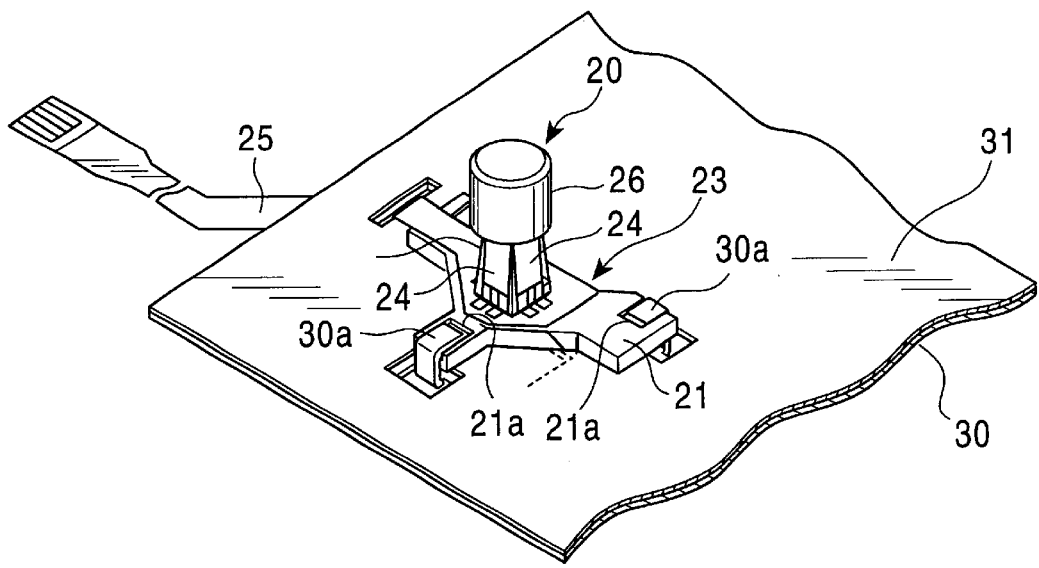
FIG. 9 is a perspective view of a pointing device mounted in a conventional keyboard input device.
Figure 10:
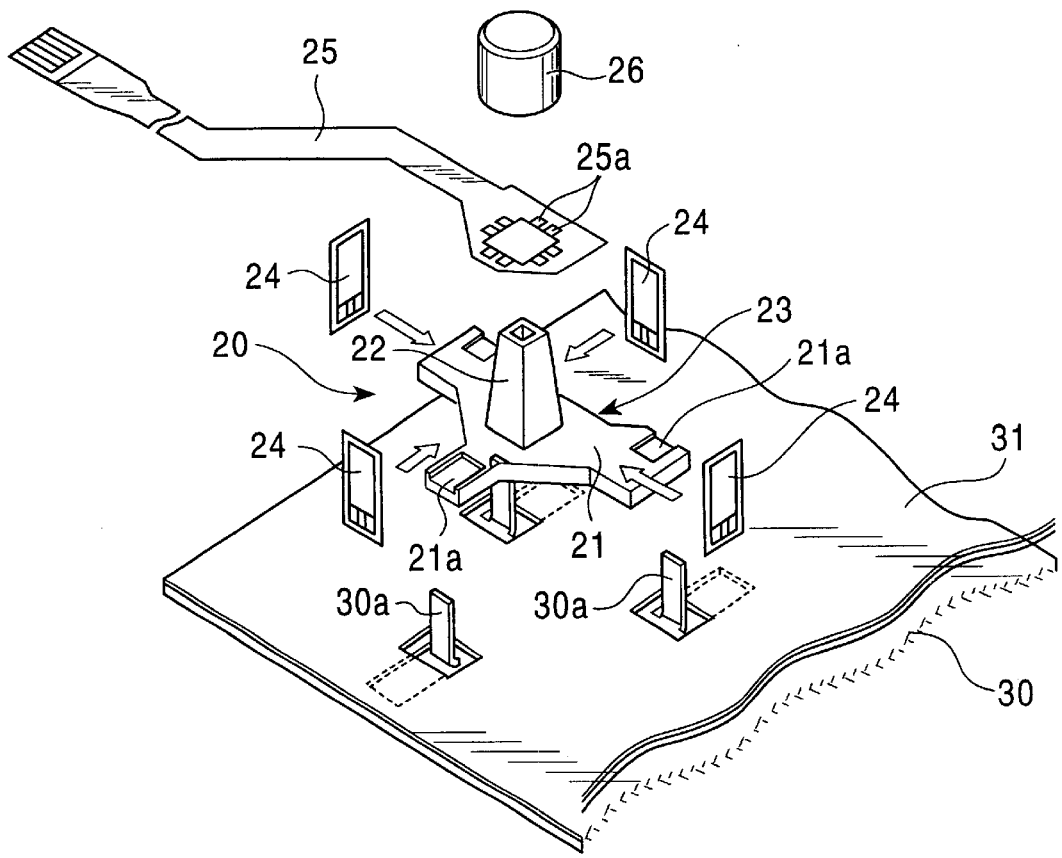
FIG. 10 is an exploded perspective view of the pointing device mounted in the conventional keyboard input device.

A keyboard input device according to an embodiment of the present invention will be described below with reference to the attached drawings. FIG. 1 is a top view of a keyboard input device according to an embodiment of the present invention, FIG. 2 is a schematic view of a base and a membrane switch mounted thereon, FIGS. 3A and 3B are partial sectional views illustrating the shape of a projection formed on the base, FIG. 4 is a perspective view of a pointing device according to the present invention, FIG. 5 is an exploded perspective view of the pointing device, FIG. 6 is a cross-sectional view showing the principal part of the pointing device mounted on the base, and FIGS. 7 and 8 are cross-sectional views showing the principal parts of other embodiments of the pointing device.

Figure 2:
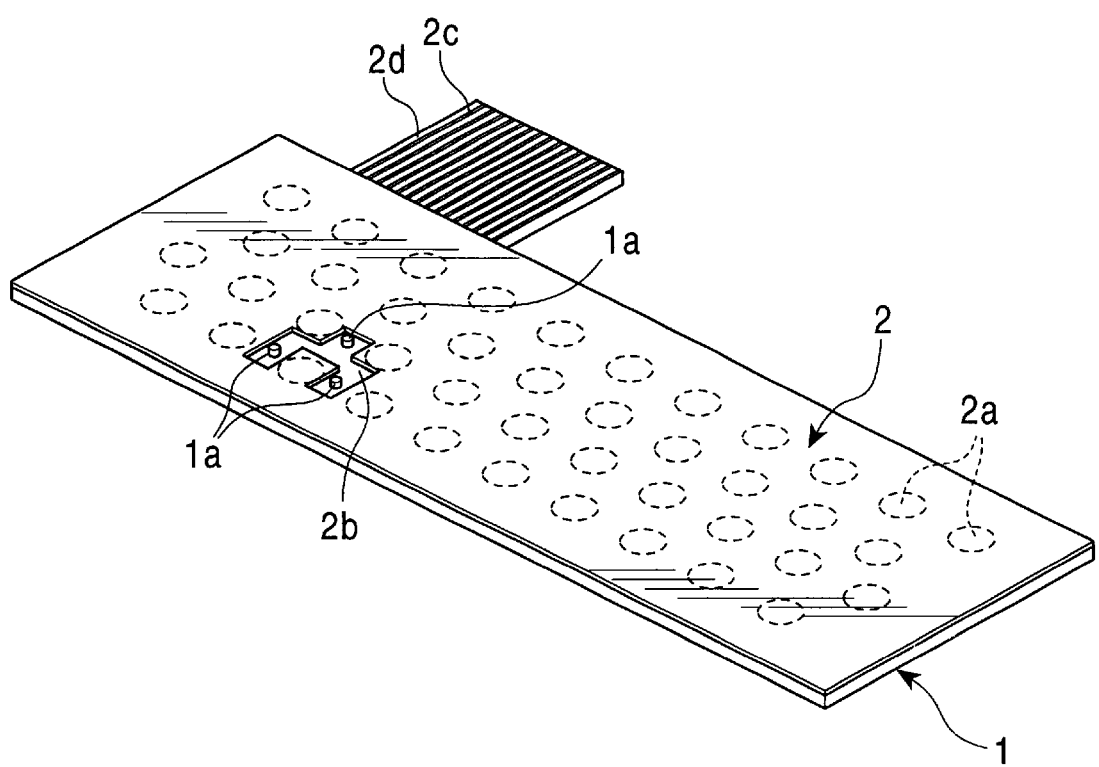
FIG. 2 is a schematic view illustrating a base and a membrane switch in the keyboard input device.

In the keyboard input device according to the present invention, as shown in FIGS. 1 and 2, a base 1 is formed of a plate of metal, such as aluminum, in the lower part thereof, and three projections 1a are formed on fixed positions of the base 1. These projections 1a may be formed by burring as shown in FIG. 3A, or by drawing as shown in FIG. 3B.

A sheetlike membrane switch 2 folded in two is placed on the upper surface of the base 1. The membrane switch 2 has a plurality of contact portions 2a, and a window 2b formed at a predetermined position so as to mount therethrough a mounting member 13 of a pointing device P, which will be described later, on the base 1. When the membrane switch 2 is placed on the base 1, the three projections 1a of the base 1 are positioned inside the window 2b.

A flexible substrate 2d is led out from the rear side of the membrane switch 2, which has wiring patterns 2c connected to the contact portions 2a and a flexible printed circuit board 12 of the pointing device P that will be described later.

Control keys 3 are correspondingly mounted on the contact portions 2a. A cap 4 of the pointing device P is placed among the tops of three control keys G, H, and B shown in FIG. 1 so as to slightly protrude thereabove.

The pointing device P is mounted on the base 1 so as to be positioned inside the window 2b of the membrane switch 2, will be described with reference to FIGS. 4 and 5.

A control member 6 molded from a synthetic resin comprises a prismatic operating portion 7, four beam portions 6a, 6b, 6c, and 6d connected to the bottom of the operating portion 7 and radially extending at right angles to one another in the form of a cross, four connecting portions 8 for connecting the outer side ends of the adjoining beam portions 6a, 6b, 6c, and 6d, and four triangular holes 9 enclosed by the adjoining beam portions 6a, 6b, 6c, and 6d and the connecting portions 8 so as to separate the beam portions 6a, 6b, 6c, and 6d.

The cap 4 is made of rubber or the like, and is press-fitted on the top of the operating portion 7, as shown in FIG. 5. The surface of the cap 4 is implanted with fiber to increase frictional resistance, thereby preventing slip and improving operability of the pointing device P.

The control member 6 is given an octagonal outline by the beam portions 6a, 6b, 6c, and 6d and the connecting portions 8. The beam portions 6a, 6b, 6c, and 6d are provided, on the lower sides thereof, recesses 10 each having a flat top face 10a. Accordingly, when the control member 6 is mounted on the surface of the mounting member 13 (which will be described later), the beam portions 6a, 6b, 6c, and 6d are floating at a predetermined distance from the mounting surface.

Since the control member 6 is made of a transformable resin material, the operating portion 7 can be tilted in the directions of the arrows X1, X2, Y1, and Y2, as shown in FIG. 4, by imposing horizontal load on the leading end of the operating portion 7 while the control member 6 is mounted on the mounting member 13.

The flexible printed circuit board (hereinafter referred to as "FPC") 12 made of polyimide resin is attached to the top faces 10a of the recesses 10. The FPC 12 includes a base portion 12a having a nearly octagonal outline to be mounted in the recesses 10 of the control member 6, and an extended portion 12b extending from one end of the base portion 12a.

On the lower surface of the base portion 12a, four sensing elements 12c constructed by strain gauges, such as resistors, are placed at predetermined positions in the form of a cross, and wiring patterns (not shown) connected to the sensing elements 12c are routed from the base portion 12a to the extended portion 12b.

The sensing elements 12c may be bonded not only to the lower surface of the control member 6, but also to the front sides of the beam portions 6a, 6b, 6c, and 6d of the control member 6.

FPC 12 is mounted by bonding the base portion 12a to the top faces 10a of the recesses 10 in the control member 6 with an adhesive or the like. The sensing elements 12c are placed on the lower side of the beam portions 6a, 6b, 6c, and 6d of the control member 6 so as to point downward, as shown in FIG. 6. This makes it possible to reduce the height of the operating portion 7, and to reduce the overall height of the pointing device P.

A resist made of an insulating material is applied to the overall lower surface of the base portion 12a and a part of the lower surface of the extended portion 12b so as to cover the sensing elements 12c and the wiring patterns.

The wiring patterns routed to the leading end of the extended portion 12b of the FPC 12 are connected to some of the wiring patterns 2c of the flexible substrate 2d in the membrane switch 2.

While four sensing elements 12c are provided in this embodiment, two sensing elements may be placed at opposing positions.

The mounting member 13 for mounting the control member 6 is formed of a flat metal plate. The mounting member 13 has an octagonal receiving portion 13a at the center thereof, and arm portions 13b extending from the receiving portion 13a in three directions. The arm portions 13b have through holes 13c for passing therethrough the three projections 1a formed on the base 1.

The mounting member 13 also has four protruding pieces 13d formed by louvering side edges of the receiving portion 13a so as to face each other.

The receiving portion 13a is configured receive the control member 6 is with the FPC 12. The control member 6 laid on the receiving portion 13a, and is mounted on the mounting member 13 by folding the four protruding pieces 13d onto the connecting portions 8.

When the control member 6 is mounted on the mounting member 13, predetermined clearances are formed between the top faces 10a serving as the lower surfaces of the beam portions 6a, 6c, 6c, and 6d and the receiving portion 13a. Therefore, even if the beam portions 6a, 6b, 6c, and 6d are bent due to load horizontally applied on the operating portion 7, the FPC 12 bonded to the top faces 10a of the recesses 10 does not contact the mounting member 13.

In the control member 6 mounted on the mounting member 13, when load is horizontally applied on the operating portion 7, the beam portions 6a, 6b, 6c, and 6d are bent in response to tilting of the operating portion 7 in the direction of arrow X1, X2, Y1, or Y2, and the top faces 10a of the recesses 10 corresponding to the bent beam portions 6a, 6b, 6c, and 6d are tensioned or compressed.

When the operating portion 7 is tilted, the beam portions 6a, 6b, 6c, and 6d can be reliably and independently bent without interfering with the adjoining beam portions because of the holes 9 formed therebetween.

Next, a description will be given of the assembly of the keyboard input device according to the present invention.

First, the sheetlike membrane switch 2 is laid on the base 1. In this case, the three projections 1a formed on the base 1 are placed inside the window 2b of the membrane switch 2.

Next, the pointing device P is laid on the base 1 by fitting the holes 13c of the mounting member 13 in the pointing device P on the projections 1a of the base 1, so that the mounting member 13 is placed at the window 2b of the membrane switch 2.

As shown in FIG. 6, the leading ends of the projections 1a protruding above the upper surface of the mounting member 13 are caulked by a caulking tool (not shown), thereby mounting the pointing device P on the base 1.

In this way, since the pointing device has a structure in which the sensing elements 12c and the mounting member 13 are separate, it can be fixed without imposing any unnecessary load on the sensing elements 12c when mounting the mounting member 13 in the keyboard input device.

Next, a number of control keys 3 formed in the base 1 corresponding to the number of the contact portions 2a in the membrane switch 2 are mounted in a plurality of mounting portions (not shown) in proper alignment.

Accordingly, the cap 4 attached to the operating portion 7 of the pointing device P is placed among the tops of three control keys G, H, and B so as to slightly protrude above the key tops thereof.

Since the pointing device P is thus placed among the key tops of the three control keys G, H, and B in the keyboard input device according to the present invention, the operator can easily operate the pointing device P with the right or left forefinger while pressing desired control keys 3.

In the operation of the pointing device P, when the operating portion 7 is tilted in the X1-direction in FIG. 4, the lower side of the beam portion 6a is bent to be compressed, while the lower side of the beam portion 6b is bent to be tensioned. Therefore, the resistance of the sensing element 12c on the lower side of the beam portion 6a decreases, while the resistance of the sensing element 12c on the lower side of the beam portion 6b increases.

Furthermore, when the operating portion 7 is tilted down in the X2-direction, the lower side of the beam portion 6a is bent to be tensioned, while the lower side of the beam portion 6b is bent to be compressed. Therefore, the resistance of the sensing element 12c on the lower side of the beam portion 6a increases, while the resistance of the sensing element 12c on the lower side of the beam portion 6b decreases. This produces a voltage difference between the sensing elements 12c, and the cursor can be moved in the X-axis direction.

When the control portion 7 is tilted in the Y1-direction, the lower side of the beam portion 6c is bent to be compressed, while the lower side of the beam portion 6d is bent to be tensioned. Therefore, the resistance of the sensing element 12c on the lower side of the beam portion 6c decreases, and the resistance of the sensing element 12c on the lower side of the beam portion 6d increases.

Furthermore, when the operating portion 7 is tilted in the Y2-direction, the lower side of the beam portion 6c is bent to be tensioned, while the lower side of the beam portion 6d is bent to be compressed. Therefore, the resistance of the sensing element 12c on the lower side of the beam portion 6c increases, while the resistance of the sensing element 12c on the lower side of the beam portion 6d decreases. This produces a voltage difference between the sensing elements 12c, and the cursor can be moved in the Y-axis direction.

While the base 1 has the projections 1a and the mounting member 13 has the holes 13c in this embodiment, the base 1 may have holes (not shown) and the mounting member 13 may have projections (not shown).

That is, it is satisfactory for one of the mounting member 13 and the base 1 to have holes and for the other to have projections.

The three projections 1a of the base 1 may be replaced with holes 1b, as shown in FIG. 7. In this case, the holes 13c of the mounting member 13 are aligned with the holes 1b, and rivets 14 or eyelets (not shown) are passed through the holes 1b and 13c and are caulked, thereby mounting the pointing device P on the base 1.

While the mounting device 13 of the pointing device P is mounted on the upper surface of the base 1 in the above embodiment, it may instead be mounted on the lower surface of the base 1, as shown in FIG. 8.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A keyboard input device comprising:

a membrane switch having a plurality of contacts;

a plurality of control keys arranged on said contacts so as to operate said membrane switch;

a base for placing said membrane switch thereon; and a pointing device mounted on said base and having a control member including an operating portion and a plurality of sensing elements, said control member being mounted on a mounting member, wherein said pointing device is mounted on said base by a plurality of mounting connections spaced apart from the operating portion of said control member, each of said mounting connections comprising a mounting hole on one of said mounting member and said base, and a projection on the other of said mounting member and said base, said projection extending through said hole and being joined thereto by caulking, and wherein said operating portion of said pointing device is placed among said plurality of control keys.

2. A keyboard input device according to claim 1, wherein said base and said mounting member are made of metal, and said projection is formed by burring or drawing.

3. A keyboard input device comprising:

a membrane switch having a plurality of contacts;

a plurality of control keys arranged on said contacts so as to operate said membrane switch;

a base for placing said membrane switch thereon; and a pointing device mounted on said base and having a control member including an operating portion and a plurality of sensing elements, said control member being mounted on a mounting member, wherein said pointing device is mounted on said base by a plurality of mounting connections spaced apart from the operating portion of said control member, each of said mounting connections comprising a hole in said mounting member and said base, and an eyelet or a rivet is passed through said holes in mutual alignment and is caulked so as to mount said pointing device on said base.

4. A keyboard input device according to claim 1, wherein said mounting member is mounted on the upper surface of said base.

5. A keyboard input device according to claim 1, wherein said mounting member is mounted on the lower surface of said base.

6. A keyboard input device according to claim 3, wherein said mounting member is mounted on the upper surface of said base.

7. A keyboard input device according to claim 3, wherein said mounting member is mounted on the lower surface of said base.

8. A keyboard input device according to claim 1, wherein said plurality of sensing elements are mounted on a planar surface of said control member that extends orthogonally to an operational axis of said operating portion.

9. A keyboard input device according to claim 1, wherein said plurality of sensing elements are disposed on a flexible printed circuit board disposed between said control member and said mounting member.

10. A keyboard input device according to claim 1, wherein said control member comprises a plurality of outwardly extending arms that extend orthogonally to an operational axis of said operating portion, and further wherein said outwardly extending arms are connected to a surface of said mounting member.

11. A keyboard input device according to claim 1, wherein said plurality of sensing elements are mounted on a planar surface of said control member that extends orthogonally to an operational axis of said operating portion.

12. A keyboard input device according to claim 1, wherein said plurality of sensing elements are disposed on a flexible printed circuit board disposed between said control member and said mounting member.

13. A keyboard input device according to claim 1, wherein said control member comprises a plurality of outwardly extending arms that extend orthogonally to an operational axis of said operating portion, and further wherein said outwardly extending arms are connected to a surface of said mounting member.

* * * * *